United States Patent [19]

Chen

[11] Patent Number: 5,083,249
[45] Date of Patent: Jan. 21, 1992

[54] LIGHT MARKER FOR FISHING ROD

[76] Inventor: Liang-Tsai Chen, No. 1, Alley 40, Lane 161, Ku Shan First St., Ku Shan, Kaoshiung, Taiwan

[21] Appl. No.: 692,916

[22] Filed: Apr. 29, 1991

[51] Int. Cl.⁵ .............................................. F21M 5/00
[52] U.S. Cl. .................................... 362/191; 362/102
[58] Field of Search ................ 362/102, 191, 109, 800

[56] References Cited

U.S. PATENT DOCUMENTS

| | | | |
|---|---|---|---|
| 2,643,371 | 6/1953 | Sleeger | 362/191 |
| 2,722,076 | 11/1955 | Benedetti | 362/191 |
| 3,918,191 | 11/1975 | Villiamson | 362/191 |

*Primary Examiner*—Carroll B. Dority

[57] ABSTRACT

A light marker for fishing rod comprises a main body which has a plurality of female threads in its inner periphery, a battery unit which has two cells in parallel and a plurality of male threads at the lower outer periphery of the battery unit, a light-emitting diode which has a ring-shaped upper conductor and a rod-shaped lower conductor, a cupped pusher which has a lower protrusion and an upper protrusion, and a holder which has a vertical through hole and a transverse taper hole. The battery unit is disposed in the upper center of the main body. The light-emitting diode is disposed at the front portion of the main body. The cupped pusher is disposed below the battery unit. The holder is disposed beneath the main body.

1 Claim, 7 Drawing Sheets

LIGHT MARKER FOR FISHING ROD

BACKGROUND OF THE PRESENT INVENTION

The present invention relates to a light marker which is positioned on a fishing rod to detect the flow of fish at night.

There are various light equipments such as fluorescent lamps, fluorescent buoys, and flashlights for detecting the flow of fish at night. Most of the light equipments cannot be positioned on the end portion of a fishing rod. Thus the user has to use one hand to hold the light equipments and another hand to hold the fishing rod. Since most light equipments generate strong light, most fish will not stay around the hook area.

SUMMARY OF THE PRESENT INVENTION

The main object of the present invention is to provide a light marker for fishing rod so that a user can detect the fish in the hook area by watching the shock of the light marker at night.

Another object of the present invention is to provide a light marker for fishing rod so that people will not approach the fishing rod while the fishing rod is inserted in the ground at night.

Accordingly, the user can use the light marker of the present invention instead of the strong light generated by flashlight, fluorescent lamps, or fluorescent buoys. The user can watch the movement of the light marker on the end portion of the fishing rod instead of the movement of a buoy at night. Therefore, the light marker can be used as a warning light while the fishing rod is inserted in the ground. Since the fishing rod is above the surface of water, the fish under water will not detect the light marker on the end portion of the fishing rod.

DESCRIPTION OF THE PREFERRED EMBODIMENT

Figure 1:
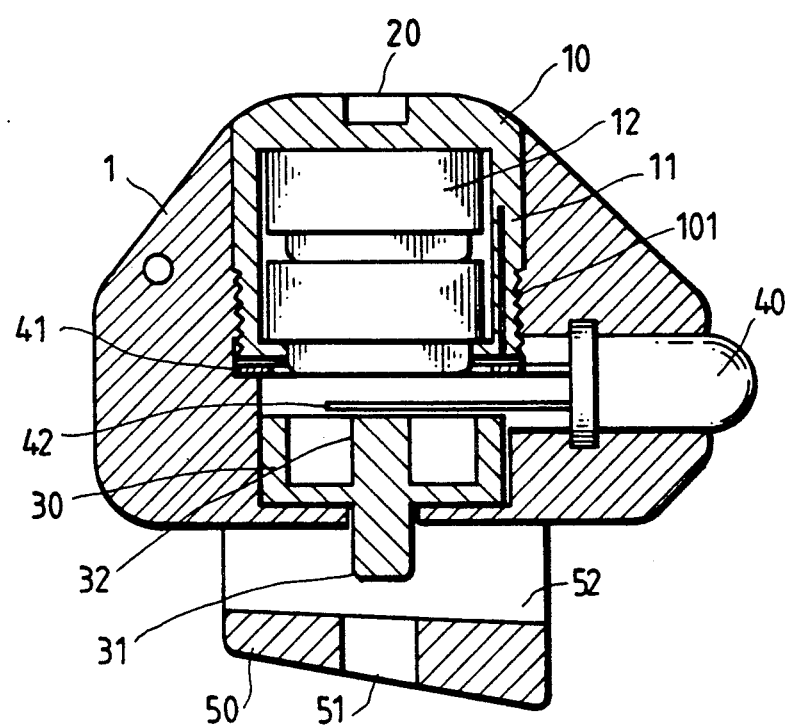
FIG. 1 is a cross-sectional view of a light marker of a preferred embodiment in accordance with the present invention.

Referring to FIGS. 1 to 6, a light marker for fishing rod comprises a main body 1, a battery unit 10, a coin slot 20, a pusher 30, a light-emitting diode 40, and a holder 50. The battery unit 10 is disposed in the upper center of the main body 1. The battery unit 10 comprises two cells 12 in parallel, a battery conductor 11 at one side of the battery unit 10, and a plurality of male threads 13 at the lower outer periphery of the battery unit 10 match the corresponding female threads 101 of the main body 1. The battery unit 10 has a coin slot 20 on its top end. A coin 21 can be inserted in the slot 20 to rotate the battery unit 10 so that the battery unit 10 will be ascended or descended. The light-emitting diode 40 which is disposed at the front portion of the main body 1 has an upper conductor 41 and a lower conductor 42 extending rearwardly. The lower conductor 42 is in a rod shape, and the upper conductor 41 is in a ring shape.

Figure 2:
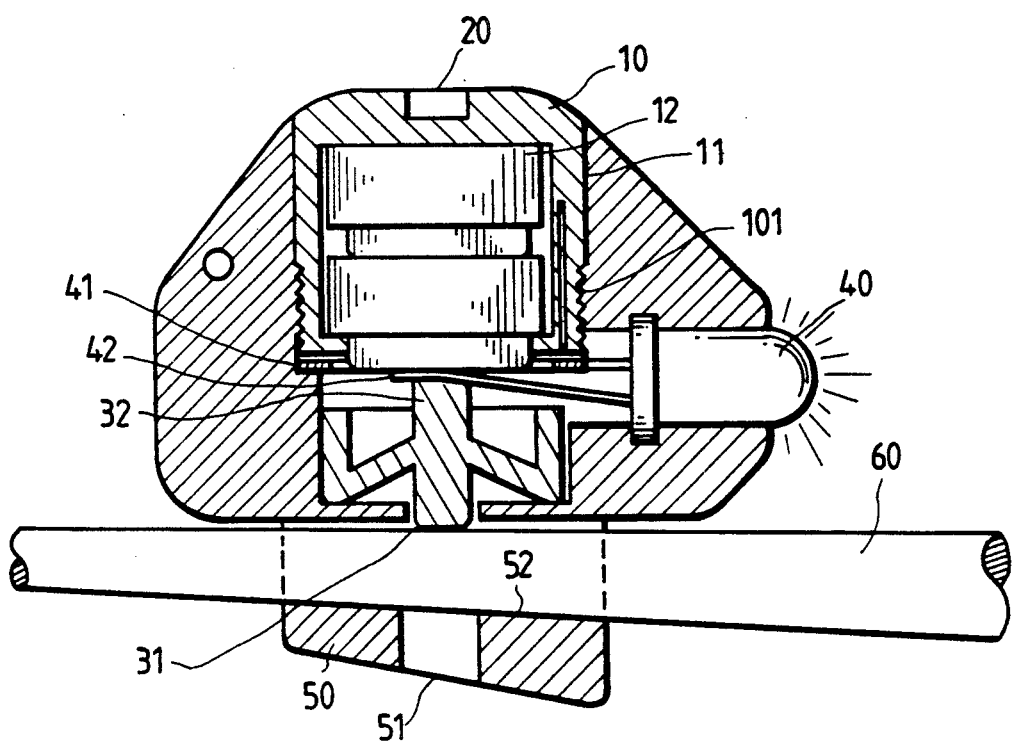
FIG. 2 is a cross-sectional view of a light marker in FIG. 1 and a fishing rod which illustrates that the light marker is lightened.
Figure 3:
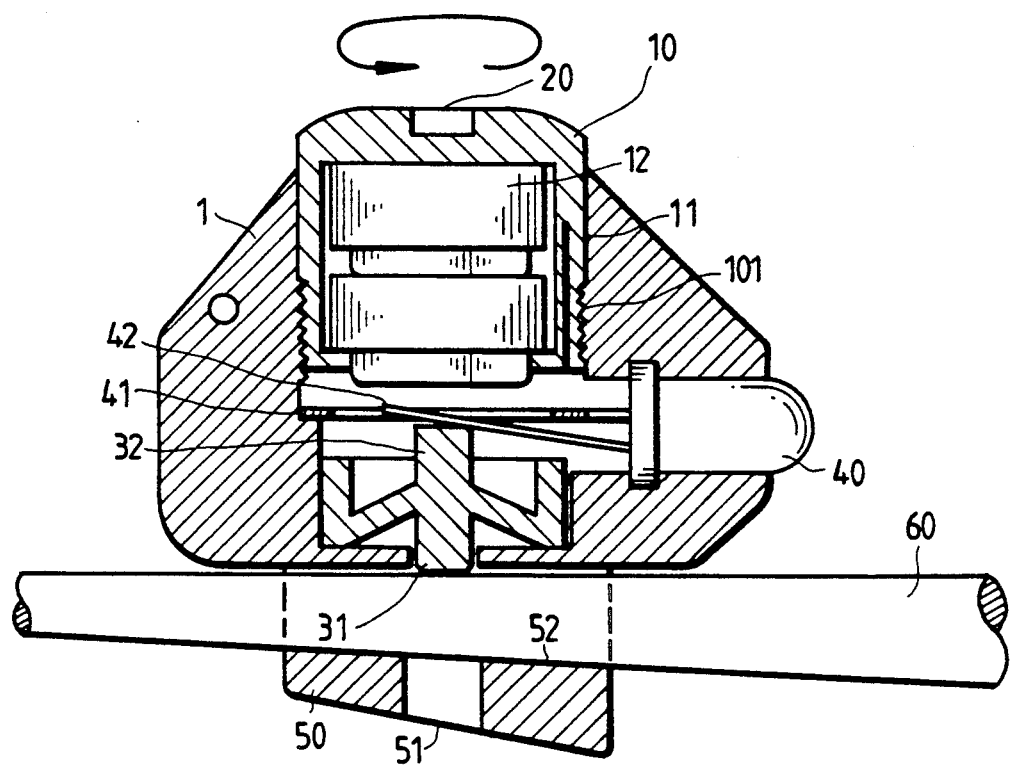
FIG. 3 is a cross-sectional view of a light marker in FIG. 1 and a fishing rod which illustrates that the light marker is extinguished.
Figure 4:
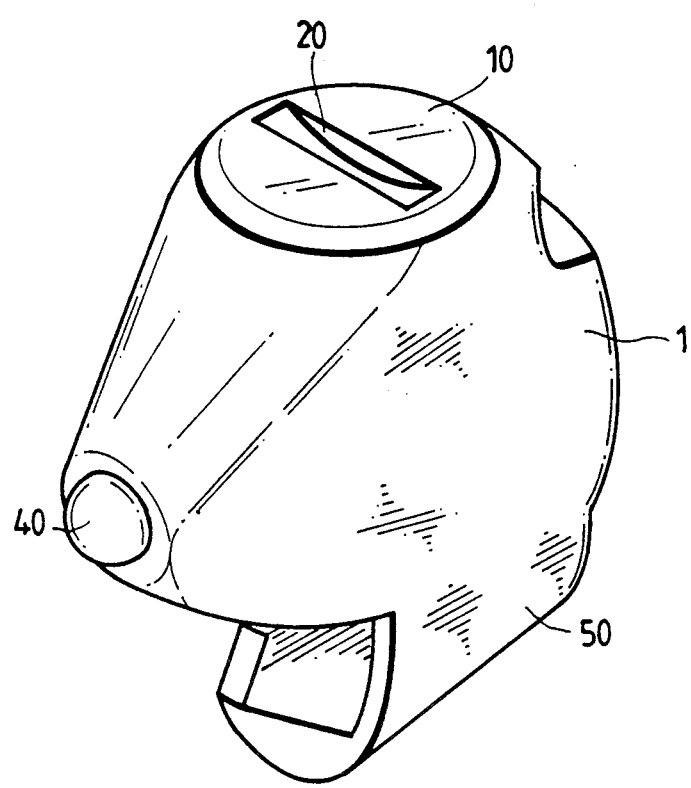
FIG. 4 is a perspective view of a light marker in FIG. 1.
Figure 5:
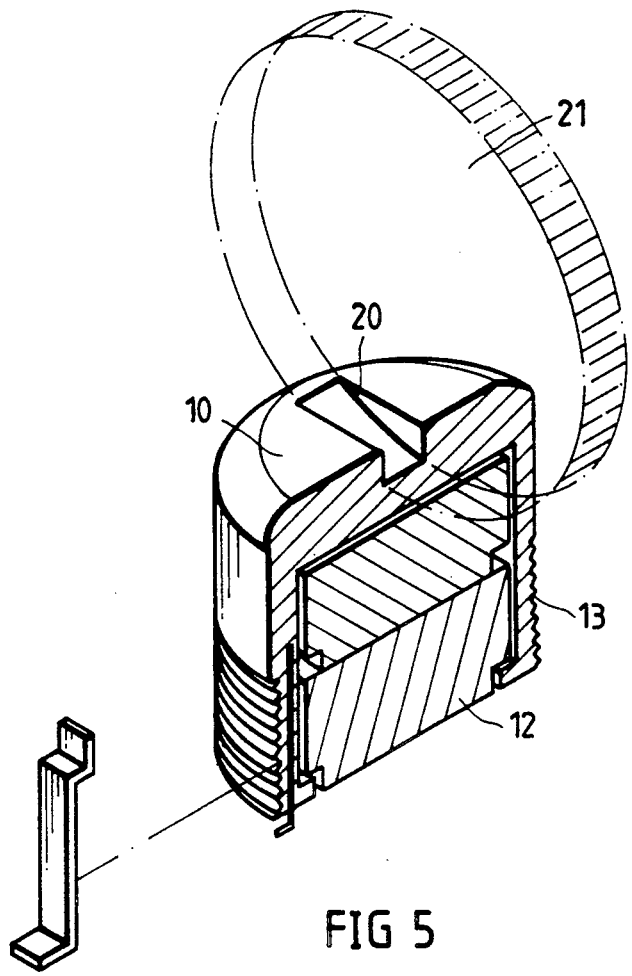
FIG. 5 is a partly perspective view of a battery unit in FIG. 1 and a coin in accordance with the present invention.
Figure 6:
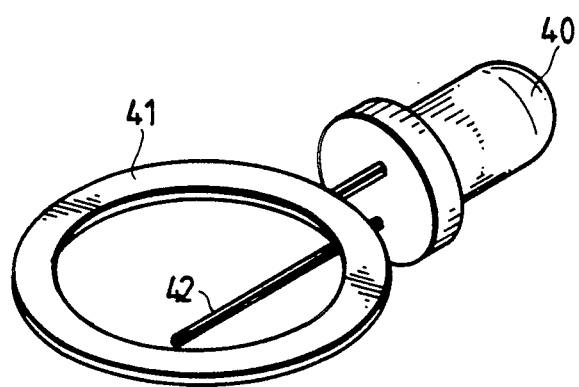
FIG. 6 is a perspective view of a light-emitting diode in FIG. 1.
Figure 9:
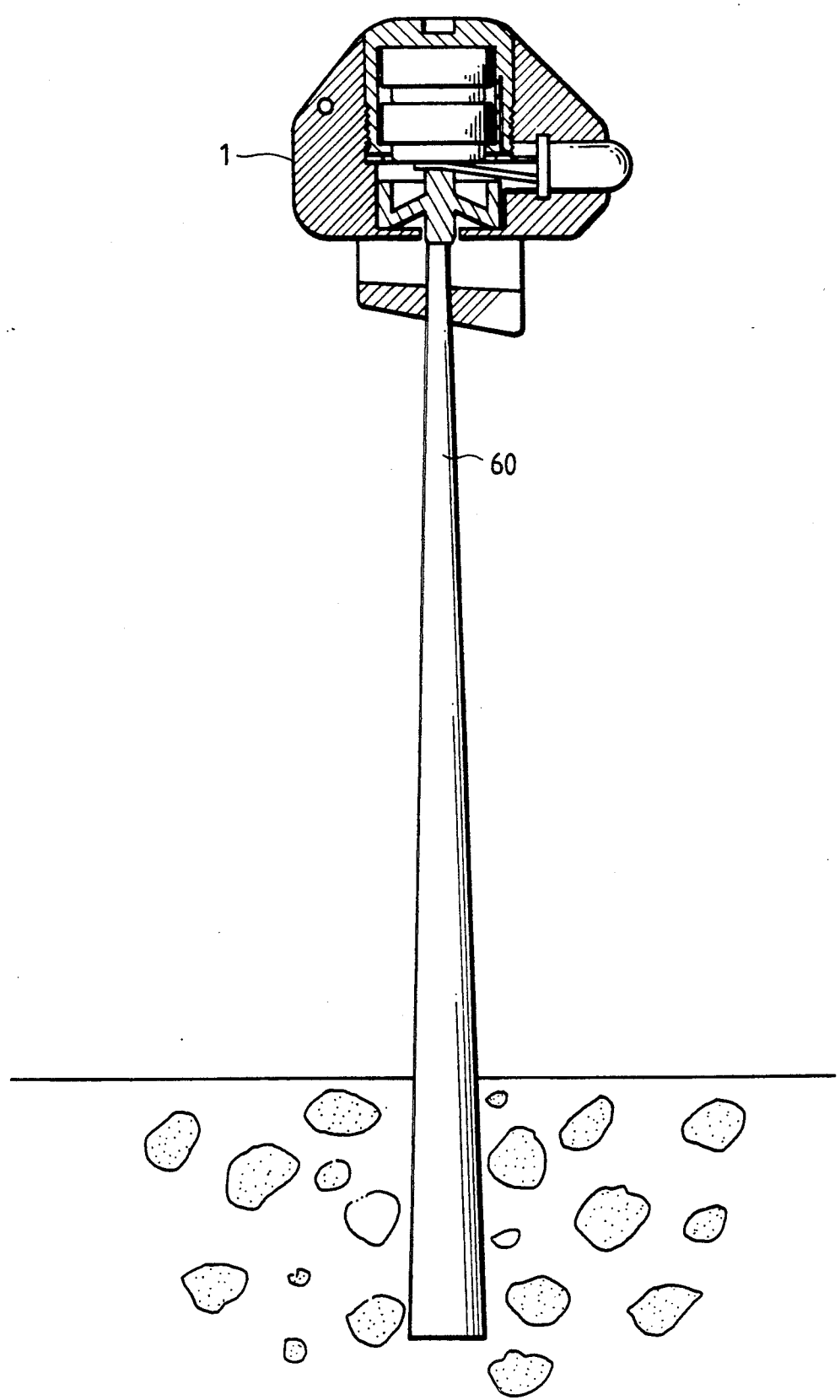
FIG. 9 is a cross-sectional view of a light marker on the top end of a fishing rod which is inserted in the ground.

Referring to FIGS. 1, 2, 3, and 8, the cupped pusher 30 which is disposed below the battery unit 10 has a lower protrusion 31 extending downwardly form the bottom center of the cupped pusher 30 and an upper protrusion 32 extending upwardly from the bottom center of the cupped pusher 30. Referring to FIGS. 2 and 9, the lower protrusion 31 is pushed up by a fishing rod 60. The holder 50 which is disposed beneath the main body 1 has a vertical through hole 51 and a transverse taper hole 52. The fishing rod 60 can be inserted through the vertical through hole 51 as shown in FIG. 9, or the fishing rod 60 can be inserted through the transverse taper hole 52 as shown in FIG. 2. When the lower protrusion 31 is pushed up, the upper protrusion 32 is pushed up also. Thus the lower conductor 42 is pushed up by the upper protrusion 32 so that the lower conductor 42 can touch the bottom of the battery unit 10.

Figure 7:
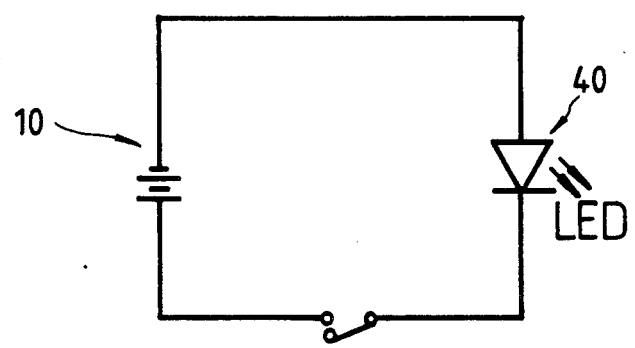
FIG. 7 is a circuit diagram of a preferred embodiment in accordance with the present invention.
Figure 8:
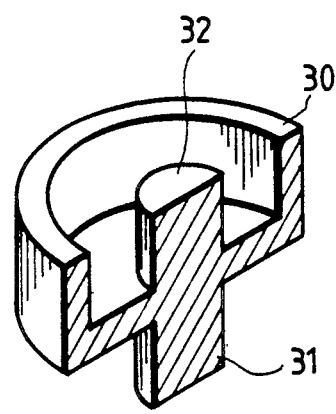
FIG. 8 is a partly perspective view of a pusher in FIG. 1.

Referring to FIG. 7, a light-emitting diode (LED) 40 is shown in a circuit diagram. The light of the light-emitting diode 40 is so dim that the fish under water cannot detect the dim light. Therefore, the fish still swims in the dark. The user can watch the light of the light-emitting diode instead of watching the buoy at night.

When the coin slot 20 is rotated by a coin 21 counter-clockwisely, the battery unit 10 will be ascended so that the circuit will be open whether the fishing rod 60 is inserted through the holder 50 or not.

I claim:
1. A light marker for fishing rod comprising:
a main body having a plurality of female threads in an inner periphery of said main body;
a battery unit disposed in an upper center of said main body;
said battery unit having two cells in parallel, a battery conductor at one side of said battery unit, and a plurality of male threads at a lower outer periphery of said battery unit;
said battery unit having a coin slot on a top end of said battery unit;
a light-emitting diode disposed at a front portion of said main body;
said light-emitting diode having a ring-shaped upper conductor extending rearwardly and a rod-shaped lower conductor extending rearwardly;
a cupped pusher disposed below said battery unit;
said cupped pusher having a lower protrusion extending downwardly from a bottom center of said cupped pusher and an upper protrusion extending upwardly from a bottom center of said cupped pusher;
a holder disposed beneath said main body;
said holder having a vertical through hole and a transverse taper hole therein.

* * * * *